US012148969B2

(12) United States Patent
Köppendörfer et al.

(10) Patent No.: US 12,148,969 B2
(45) Date of Patent: Nov. 19, 2024

(54) CABLE HAVING A DIELECTRIC MEDIUM WITH PLURAL DIELECTRIC WAVEGUIDES DISPOSED THEREIN WHICH ARE ORIENTED AT PREFERRED POLARIZATIONS

(71) Applicant: LEONI KABEL GMBH, Roth (DE)

(72) Inventors: Erwin Köppendörfer, Schwabach (DE); Thorsten Fink, Nuremberg (DE); Dominik Dorner, Weissenburg (DE); Felix Distler, Erlangen (DE)

(73) Assignee: LEONI KABEL GMBH, Roth (DE)

( * ) Notice: Subject to any disclaimer, the term of this patent is extended or adjusted under 35 U.S.C. 154(b) by 440 days.

(21) Appl. No.: 17/609,909

(22) PCT Filed: May 11, 2020

(86) PCT No.: PCT/EP2020/062976
§ 371 (c)(1),
(2) Date: Jan. 11, 2022

(87) PCT Pub. No.: WO2020/229382
PCT Pub. Date: Nov. 19, 2020

(65) Prior Publication Data
US 2022/0209386 A1 Jun. 30, 2022

(30) Foreign Application Priority Data
May 16, 2019 (DE) ........................ 102019112926.5

(51) Int. Cl.
*H01P 3/16* (2006.01)
*H01P 1/06* (2006.01)
*H01P 11/00* (2006.01)

(52) U.S. Cl.
CPC ................ *H01P 3/16* (2013.01); *H01P 1/065* (2013.01); *H01P 11/006* (2013.01)

(58) Field of Classification Search
CPC ........... H01P 3/16; H01P 1/065; H01P 11/006
(Continued)

(56) References Cited

U.S. PATENT DOCUMENTS 6,104,264 A 8/2000 Ishikawa et al.
6,585,566 B2 7/2003 Takeda
(Continued)

FOREIGN PATENT DOCUMENTS

EP 0637762 A1 8/1995

*Primary Examiner* — Benny T Lee
(74) *Attorney, Agent, or Firm* — Tarolli, Sundheim, Covell & Tummino LLP

(57) ABSTRACT

A cable is provided which has a dielectric medium forming a chamber which can also be filled by the dielectric medium. The cable additionally has a first dielectric waveguide element and a second dielectric waveguide element. The first dielectric waveguide element is arranged at a distance from the second dielectric waveguide element. The first dielectric waveguide element runs along a longitudinal direction of the cable through the chamber formed by the dielectric medium, and the second dielectric waveguide element runs along the longitudinal direction of the cable through the chamber formed by the dielectric medium. The polarization direction of the first dielectric waveguide element differs from the preferred polarization direction of the second dielectric waveguide element.

20 Claims, 9 Drawing Sheets

(58) Field of Classification Search
USPC ................................................ 333/239, 21 A
See application file for complete search history.

(56) References Cited

U.S. PATENT DOCUMENTS

| | | | | |
|---|---|---|---|---|
| 9,350,063 | B2 * | 5/2016 | Herbsommer et al. | ... H01P 1/04 |
| 10,347,397 | B2 | 7/2019 | Armbrecht et al. | |
| 11,205,829 | B2 | 12/2021 | Zebhauser et al. | |
| 2014/0285293 | A1 | 9/2014 | Schuppener et al. | |
| 2016/0240907 | A1 | 8/2016 | Haroun | |
| 2018/0159195 | A1 | 6/2018 | Henry et al. | |

* cited by examiner

CABLE HAVING A DIELECTRIC MEDIUM WITH PLURAL DIELECTRIC WAVEGUIDES DISPOSED THEREIN WHICH ARE ORIENTED AT PREFERRED POLARIZATIONS

RELATED APPLICATIONS

This application filed under 35 U.S.C § 371 is a national phase application of International Application Number PCT/EP2020/062976, filed May 11, 2020, which claims the benefit of German Application No. 10 2019 112 926.5 filed May 16, 2019, the subject matter of which are incorporated herein by reference in their entirety.

TECHNICAL FIELD

Examples of the invention relate to concepts for transmitting high-frequency electromagnetic signals and applications related to this, and in particular to a cable and a method for manufacturing the same.

BACKGROUND

A plurality of options exists for transmitting data. Beginning with symmetric and asymmetric transmission forms, even hollow waveguides and optical fibres are customary. Another option is transmission via dielectric waveguides. Dielectric waveguides operate without a share of a conductive constituent in the transmission medium. On account of their transmission principle also they should be arranged close to the optical fibres.

When transmitting high-frequency signals, the conductivity of a metal, for example, is used. The energy is carried in this case between two metal conductor surfaces inside a dielectric insulation material. Energy transportation in the hollow waveguide takes place inside a hollow conductive structure coordinated in size to the desired frequency. High frequencies coordinated to the geometry of the hollow waveguide are necessary here to produce a wave mode that is capable of propagation. Symmetric and asymmetric lines up to the lower GHz range can be used for this (e.g. even up to 25 GHz).

In coaxial structures, the maximum operating frequency range is limited by what is termed the "cut-off" frequency, above which additional modes propagate. For higher frequencies, the hollow waveguide accordingly represents a more suitable transmission medium.

A disadvantage underlies all the aforesaid transmission principles. The energy of the transmission is always carried by means of metal conductors. Here the resistance increases at high frequencies due to the skin effect, leading to a rise in transmission losses. At frequencies in the range from a few GHz up to more than 100 GHz the losses are so great that a sufficiently long distance can no longer be spanned in the application. Moreover, hollow waveguides are inflexible and have a high weight.

Another means of data transmission is constituted by an optical fibre. In this case, data is sent in a structure consisting of an optical core with a surrounding "cladding". The frequencies used here are so high that they are in the range of light (several hundred terahertz). One disadvantage of this transmission form is that an electrical signal always has to be converted first into a light signal and the materials involved in the transmission must meet high optical demands (e.g. purity, transparency and refractive index).

The technologies presented above are not well suited to transmitting data in a frequency range from a few dozen GHz up to a few hundred GHz. This is where the dielectric waveguide comes into play. This line consists of non-conductive materials. It is important here to provide layering of different dielectric constants. A very high-frequency signal injected into the dielectric waveguide adheres to the boundary layer between high and lower $\varepsilon_r$ (=relative dielectric constant) and is transmitted in the propagation direction with little loss.

There are dielectric waveguides in the prior art that are part of circuit boards and are adapted to the conditions predetermined by the respective circuit boards. Here materials are used on the one hand that do not meet automotive requirements in relation to flexibility and mechanical installation and cannot be manufactured in any length on the other hand.

Another limitation should be seen in the fact that on account of their pronounced field pattern outside of the inner region with a large $\varepsilon_r$, waveguides easily experience crosstalk with adjacent systems. In a waveguide system, for example, two dielectric waveguides, each with a high $\varepsilon_r$ and a circular or at least virtually circular cross section are arranged adjacent to one another in a plastic sheath with a lower $\varepsilon_r$. A high-frequency signal injected into one of these dielectric waveguides is accompanied by electromagnetic fields, which also penetrate the adjacent dielectric waveguide (second waveguide positioned in the vicinity) and produce a signal in this that overlays a useful signal injected into this (second) dielectric waveguide and influences this.

Cables with dielectric waveguides must where possible be optimized with regard to a reduction in electromagnetic coupling. It is nonetheless desirable to form cables with a small spatial extension.

A requirement may exist for providing concepts for cables with dielectric waveguides that experience less mutual interference and at the same time do not take up any more space.

SUMMARY OF THE INVENTION

According to a first aspect of the invention, a cable is provided. The cable has a dielectric medium. The dielectric medium forms a chamber. The chamber can also be filled by the dielectric medium. The cable further has a first dielectric waveguide element. The cable also has a second dielectric waveguide element. The first dielectric waveguide element is spaced at a distance from the second dielectric waveguide element. The first dielectric waveguide element extends along a longitudinal direction of the cable through the chamber formed by the dielectric medium. The second dielectric waveguide element extends along the longitudinal direction of the cable through the chamber formed by the dielectric medium. A preferred polarization direction of the first dielectric waveguide element differs from a preferred polarization direction of the second dielectric waveguide element.

Due to the different preferred polarization directions, fewer electromagnetic fields are coupled from the first waveguide element into the second waveguide element and at the same time a space-saving cable is provided.

Each waveguide element can form a waveguide together with the dielectric medium. The waveguide element can serve here as the transmission medium.

The first and second dielectric waveguide elements can extend/be arranged in parallel along the chamber or the cable.

The first and second dielectric waveguide elements can each be formed to transmit a high-frequency signal. For example, the first dielectric waveguide element can be used as a transmitting path and the second dielectric waveguide element as a receiving path or vice versa. The first and the second dielectric waveguide elements can be used in just the same way as transmitting path or receiving path.

The dielectric medium can surround the first and second dielectric waveguide elements extending in the chamber. The dielectric medium can surround the first and the second dielectric waveguide elements respectively here so that at end pieces of the cable, each first and second dielectric waveguide element is connectable to a complementary end piece of a cable or plug. Inside the chamber the dielectric medium can fill a section between the first and second waveguide elements.

The preferred polarization direction of the first dielectric waveguide element can be predetermined by a cross section of the first dielectric waveguide element. The preferred polarization direction of the second dielectric waveguide element can be predetermined by a cross section of the second dielectric waveguide element. The preferred polarization direction of the first dielectric waveguide element can differ from the preferred polarization direction of the second dielectric waveguide element by an angle of at least 45° (or 60° or 75° or 90°), in particular by an angle of 90°. The cross sections of the first and second dielectric waveguide elements can be twisted relative to one another. Consequently, the first and second dielectric waveguide elements can be e.g. not point-symmetric and/or axisymmetric. For example, the dielectric waveguide elements and the waveguides thus formed are not optical fibres or hollow waveguides.

The cross sections of the first and second dielectric waveguide elements can be at least substantially identical. By twisting the cross sections relative to one another, the unintentional penetration of waves between the waveguide elements can be avoided.

The cross section of the first and/or second dielectric waveguide element can be elliptical or rectangular. The elliptical cross section can have a main axis x and a secondary axis y. The rectangular cross section can have two side lengths. The side length $l_x$ can be greater than the side length $l_y$. In particular, the side length $l_x$ can be 1.25 times (or 1.5 times or 2 times or 3 times or 4 times) greater than the side length $l_y$.

The ratio of the side lengths $l_x$ to $l_y$ can predetermine the preferred polarization direction of the first and second dielectric waveguide element. If the first and second waveguide elements are arranged twisted relative to one another in the cable, coupling into the respectively other dielectric waveguide element can be reduced hereby, as the preferred polarization directions of the first and second dielectric waveguide elements are different and have a preferred polarization predetermined by the geometry, which prevents electromagnetic waves inform the first dielectric waveguide element from penetrating the second dielectric waveguide element, and vice versa.

A spacing between the first and second dielectric waveguides can be smaller than 4 times (or 3 times or 2 times) a side length $l_x$ of the first and/or second dielectric waveguide element. Furthermore, a spacing between the first and second dielectric waveguides can correspond to at least a side length $l_x$ of the first and/or second dielectric waveguide element.

Dielectric constants of the first and second dielectric waveguide elements can be at least substantially identical. The dielectric medium can have a different dielectric constant from the first and second dielectric waveguide elements. The dielectric constant of the dielectric medium can be lower than at least one of the dielectric constants of the first and second dielectric waveguide elements. The dielectric constants of the first and/or second dielectric waveguide elements can deviate at most between 0.5% and 5% from one another, for example.

The cable can also have a jacket. The jacket can surround the chamber. The cable can be made more weather-resistant by providing the jacket. The jacket can likewise end at the end pieces of the cable.

The jacket can be at least partly conductive to avoid electromagnetic coupling. In addition or alternatively, the jacket can be at least partly non-conductive. For example, the jacket can be provided with metal armor.

The jacket can also end flush with the dielectric medium to avoid water and oxygen inclusions, whereby the cable is made more durable.

The cable can further have a third dielectric waveguide element. The third dielectric waveguide element can be spaced at a distance from the first and second dielectric waveguide elements. The preferred polarization direction of the first dielectric waveguide element can correspond to a preferred polarization direction of the third dielectric waveguide elements. The preferred polarization directions of the first, second and third dielectric waveguide element can differ respectively by an angle of 60° from one another.

The cable can further have a fourth dielectric waveguide element. The fourth dielectric waveguide element can be spaced at a distance from the first, second and third dielectric waveguide elements. The preferred polarization direction of the second dielectric waveguide element can correspond to a preferred polarization direction of the fourth dielectric waveguide element.

Using several waveguides formed by the waveguide elements and the dielectric medium can provide a greater transmission rate and more throughput. At frequencies of over 100 GHz (except for light), a higher bandwidth can likewise be provided.

A respective distance between the first and second waveguide elements, and the second and third waveguide elements, and the third and fourth waveguide elements as well as the fourth and first waveguide element can be identical. This distance can correspond to a value A.

A distance between the first and third waveguide elements can correspond to a distance between the second and fourth waveguide elements. This distance can correspond to a value B.

The value B can be √2*A. Even if the first and third or the second and fourth waveguide elements have the same preferred polarization direction, coupling into the respectively other waveguide element can be reduced due to the value B being √2 times greater than the value A.

The respective distance between the waveguide elements can be determined starting out from a centre of a respective cross section of the waveguide elements in the same cross-sectional plane of the cable.

The chamber can further include several segments. In this case, the dielectric medium can likewise be divided into several segments. Each segment of the dielectric medium can enclose/surround one of the (first/second/third/fourth) waveguide elements separately (in the chamber). The segments can be mutually in contact. The segments can each contact the jacket.

According to a second aspect of the invention, a method is provided for manufacturing a b cable according to the first aspect. The method includes provision of first and second b dielectric waveguide elements. The first and second dielectric waveguide elements are spaced at a distance from one another. The first dielectric waveguide element is twisted compared with the second dielectric waveguide element, so that a preferred polarization direction of the first dielectric waveguide element differs from a preferred polarization direction of the second dielectric waveguide element in the cable. The method can further include embedding of the first and second dielectric waveguide elements in a chamber made of a dielectric medium. Alternatively, the embedding can include embedding of the first and second dielectric waveguide elements in respective segments of the dielectric medium. The chamber can be formed by stranding of the segments.

Even if some of the aspects described above were described with reference to methods, these aspects can also apply to the cable. In just the same way, the aspects described above in relation to the cable can apply in a corresponding manner to the method.

It is likewise understood that the terms used here only serve to describe individual embodiments and are not intended to be considered a limitation. Unless otherwise defined, all technical and scientific terms used here have the meaning that corresponds to the general understanding of the expert in the specialist field relevant for the present disclosure and should be interpreted neither too broadly nor too narrowly. If specialist terms are used here incorrectly and thus do not give expression to the technical idea of the present disclosure, these terms should be replaced by specialist terms that convey a correct understanding to the expert. The general terms used here should be interpreted on the basis of the definition found in the dictionary or according to the context; too narrow an interpretation should be avoided in this case.

It should be understood here that terms such as e.g. “comprise” or “have” etc. signify the presence of the described features, numbers, operations, actions, components, parts or their combinations and do not exclude the presence or the possible addition of one or more other features, numbers, operations, actions, components, parts or their combinations.

Although terms such as “first” or “second” etc. are possibly used to described various components, these components should not be restricted to these terms. A component is only to be distinguished from the others using the above terms. For example, a first component can be described as a second component without departing from the protective scope of the present disclosure; likewise a second component can be described as a first component. The term “and/or” comprises both combination of the several objects connected to one another and any object of this plurality of the described plurality of objects.

The preferred embodiments of the present disclosure are described below with reference to the enclosed drawings; components of the same kind are always provided here with identical reference characters. In the description of the present disclosure, detailed explanations of known connected functions or constructions are dispensed with if these deviate unnecessarily from the sense of the present disclosure; such functions and constructions are still, however, comprehensible to the expert. The enclosed drawings of the present disclosure serve to illustrate the present disclosure and should not be understood as a limitation. The technical idea of the present disclosure should be interpreted in such a way that in addition to the enclosed drawings the technical idea also includes all such modifications, changes and variants.

Further objectives, features, advantages and application possibilities result from the following description of exemplary embodiments, which are not to be understood as restrictive, with reference to the associated drawings. Here all features described and/or depicted show by themselves or in any combination the subject matter disclosed here, even independently of their grouping in the claims or their references. The dimensions and proportions of the components shown in the figures are not necessarily to scale in this case and may diverge in embodiments to be implemented from what is shown here.

DETAILED DESCRIPTION

The cable and the method are now described on the basis of exemplary embodiments.

Specific details are set out below, without being restricted thereto, to supply a complete understanding of the present disclosure. It is clear to an expert, however, that the present disclosure can be used in other exemplary embodiments that may deviate from the details set out below.

Figure 1:
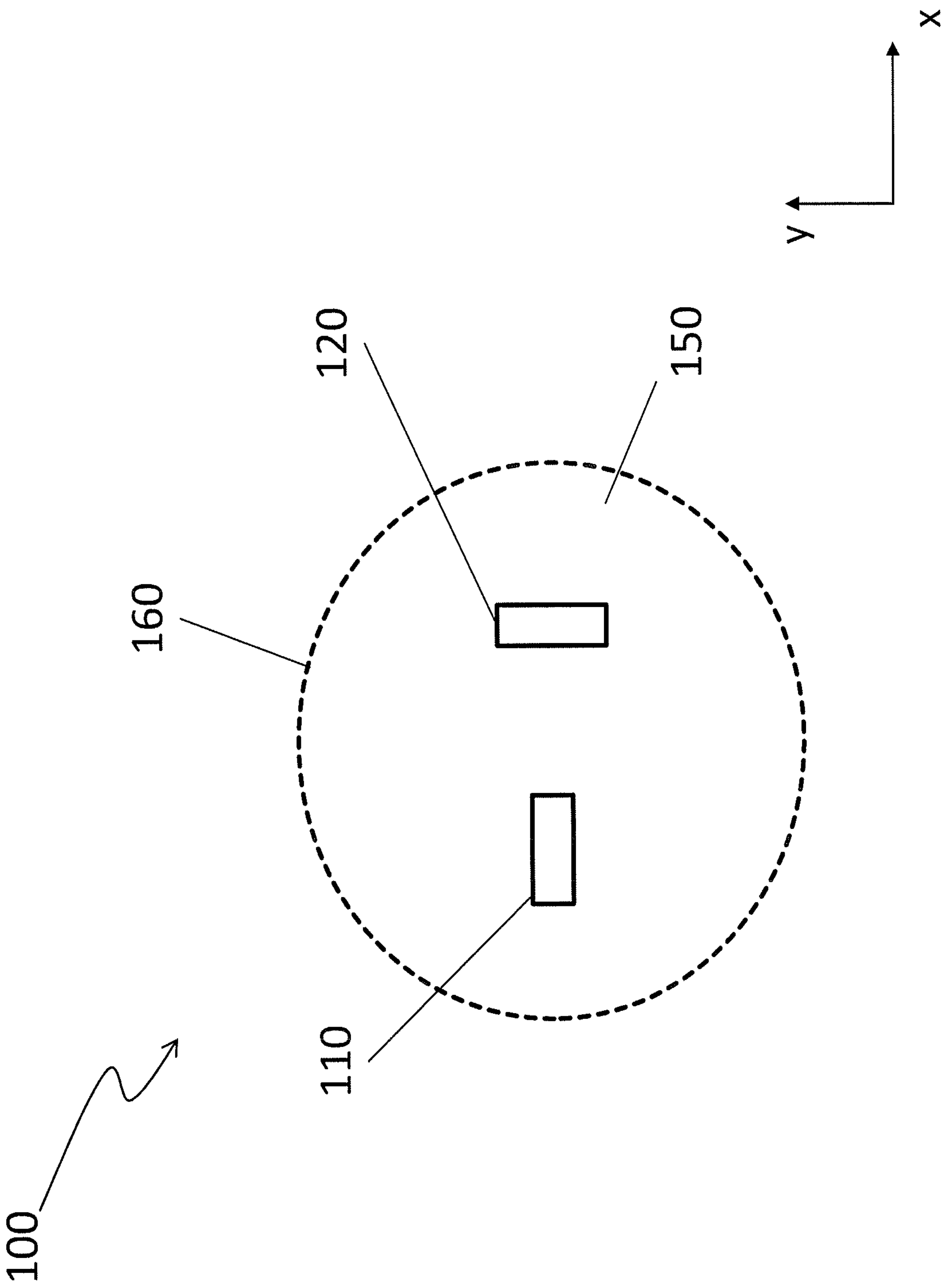
FIG. 1 shows a schematic representation of a cable with two waveguides.

FIG. 1 shows a schematic representation of a cable 100 with two waveguides, which are formed by dielectric waveguide elements 110 and 120 together with a dielectric medium 150. The dielectric medium 150 forms a chamber. The chamber can also be filled by the dielectric medium 150. The cable 100 further has a first dielectric waveguide element 110. The cable 100 further has a second dielectric waveguide element 120. The first dielectric waveguide element 110 is spaced at a distance from the second dielectric waveguide element 120. The first dielectric waveguide element 110 extends along a longitudinal direction of the cable through the chamber formed by the dielectric medium. The longitudinal direction extends into the drawing plane in FIG. 1. The chamber formed can be just a part of the cable 100 here, for example, or extend over the entire length of the cable 100. The second dielectric waveguide element 120 also extends along the longitudinal direction of the cable 120 through the chamber formed by the dielectric medium 150. A preferred polarization direction of the first dielectric waveguide element 110 differs from a preferred polarization direction of the second dielectric waveguide element 120. In FIG. 1, the preferred polarization directions are in the y-direction in the case of the first dielectric waveguide element 110 and in the x-direction in the case of the second dielectric waveguide element 120.

Due to the different preferred polarization directions, fewer electromagnetic fields can be coupled from the first waveguide element 110 into the second waveguide element 120 and at the same time a space-saving cable 100 can be provided.

In the example from FIG. 1, each waveguide element 110, 120 forms a waveguide together with the dielectric medium 150. In this case the waveguide elements 110, 120 can serve as the transmission medium.

The first and the second dielectric waveguide elements 110, 120 can extend/be arranged in parallel along the chamber or the cable 100. According to the example from FIG. 1, the first and second dielectric waveguide elements 110, 120, extend parallel into the drawing plane and are surrounded here by the dielectric medium 150. Two waveguides are formed hereby along the cable 100.

The first and the second dielectric waveguide elements 110, 120 can each be formed to transmit a high-frequency signal. For example, the first dielectric waveguide element 110 can be used as a transmitting path and the second dielectric waveguide element 120 can be used as a receiving path or vice versa. The first and the second dielectric waveguide elements 110, 120 can be used in exactly the same way as transmitting path or receiving path.

In the example from FIG. 1, the dielectric medium 150 surrounds the first and second dielectric waveguide elements 110, 120 extending in the chamber. The dielectric medium 150 can surround the first and the second dielectric waveguide elements 110, 120 respectively here so that each first and the second dielectric waveguide element 110, 120 is connectable at end pieces of the cable 100 to a complementary end piece of a cable 100 or plug. Inside the chamber the dielectric medium 150 can fill a section between the first and second waveguide elements.

The preferred polarization direction of the first dielectric waveguide element 110 can be predetermined by a cross section of the first dielectric waveguide element 110. The preferred polarization direction of the second dielectric waveguide element 120 can be predetermined by a cross section of the second dielectric waveguide element 120. The preferred polarization direction of the first dielectric waveguide element 110 can differ from the preferred polarization direction of the second dielectric waveguide element 120 by an angle of at least 45° (or 60° or 75° or 90°), in particular by 90°. In the example from FIG. 1, the preferred polarization directions of the first dielectric waveguide element 110 and the second dielectric waveguide element 120 differ by 90°. To this end the cross sections of the first and second dielectric waveguide elements 110, 120 can be twisted relative to one another. In the example from FIG. 1, the cross sections of the first and second dielectric waveguide elements 110, 120 are twisted by 90° relative to one another. Due to the twisting relative to one another, the unintentional penetration of waves between the first and second dielectric waveguide elements 110, 120 can be avoided. Consequently, the first and second dielectric waveguide elements 110, 120 can be e.g. not point-symmetric and/or axis-symmetric. For example, the dielectric waveguide elements 110, 120 and the waveguides formed thus are not optical fibres or hollow waveguides.

The cross sections of the first and second dielectric waveguide element 110, 120 are identical in FIG. 1 purely as an example.

The cross section of the first and/or second dielectric waveguide element 110, 120 can be elliptical or, as shown by way of example in FIG. 1, rectangular. The elliptical cross section can have a main axis x and a secondary axis y. The rectangular cross section can have two side lengths $l_x$ and $l_y$. The side length $l_x$ can be greater than the side length $l_y$. In particular, the side length $l_x$ can be 1.25 times (or 1.5 times or 2 times or 3 times or 4 times) greater than the side length $l_y$.

The ratio of the side lengths $l_x$ to $l_y$ can determine the preferred polarization direction of the first and second dielectric waveguide elements 110, 120. If the first and second dielectric waveguide elements 110, 120 are arranged twisted relative to one another in the cable, as is shown in FIG. 1, the interference in the respectively other dielectric waveguide element 110, 120 can thereby be reduced, as the preferred polarization directions of the first and second dielectric waveguide elements 110, 120 are different and have a preferred polarization predetermined by the geometry that prevents electromagnetic waves from the first dielectric waveguide element from penetrating the second dielectric waveguide element, and vice versa.

A distance between the first and second dielectric waveguides 110, 120 can be smaller than 4 times (or 3 times or 2 times) a side length $l_x$ of the first and/or second dielectric waveguide element 110, 120. Furthermore, a distance between the first and second dielectric waveguides 110, 120 can equal at least a side length $l_y$ of the first and/or second dielectric waveguide element 110, 120.

The dielectric constants of the first and second dielectric waveguide elements 110, 120 can be substantially identical. The dielectric medium 150 can have a different dielectric constant than the first and second dielectric waveguide elements 110, 120. The dielectric constant of the dielectric medium 150 can be lower than at least one of the dielectric constants of the first and second dielectric waveguide elements 110, 120. The dielectric constants of the first and/or second dielectric waveguide elements 110, 120 can deviate at most between 0.5% and 5% from one another, for example.

Figure 2:
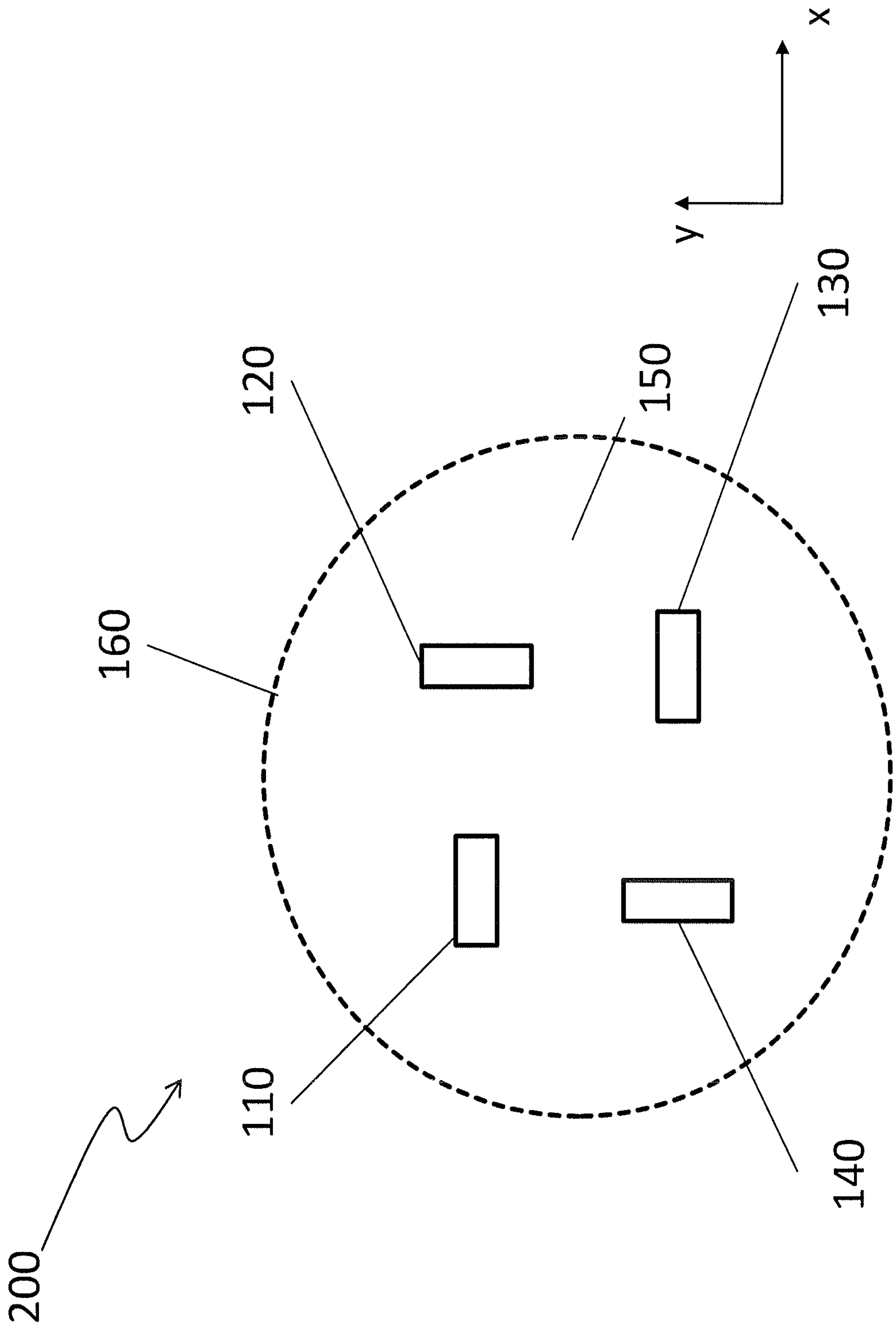
FIG. 2 shows a schematic representation of a cable with four waveguides in a first arrangement.
Figure 3:
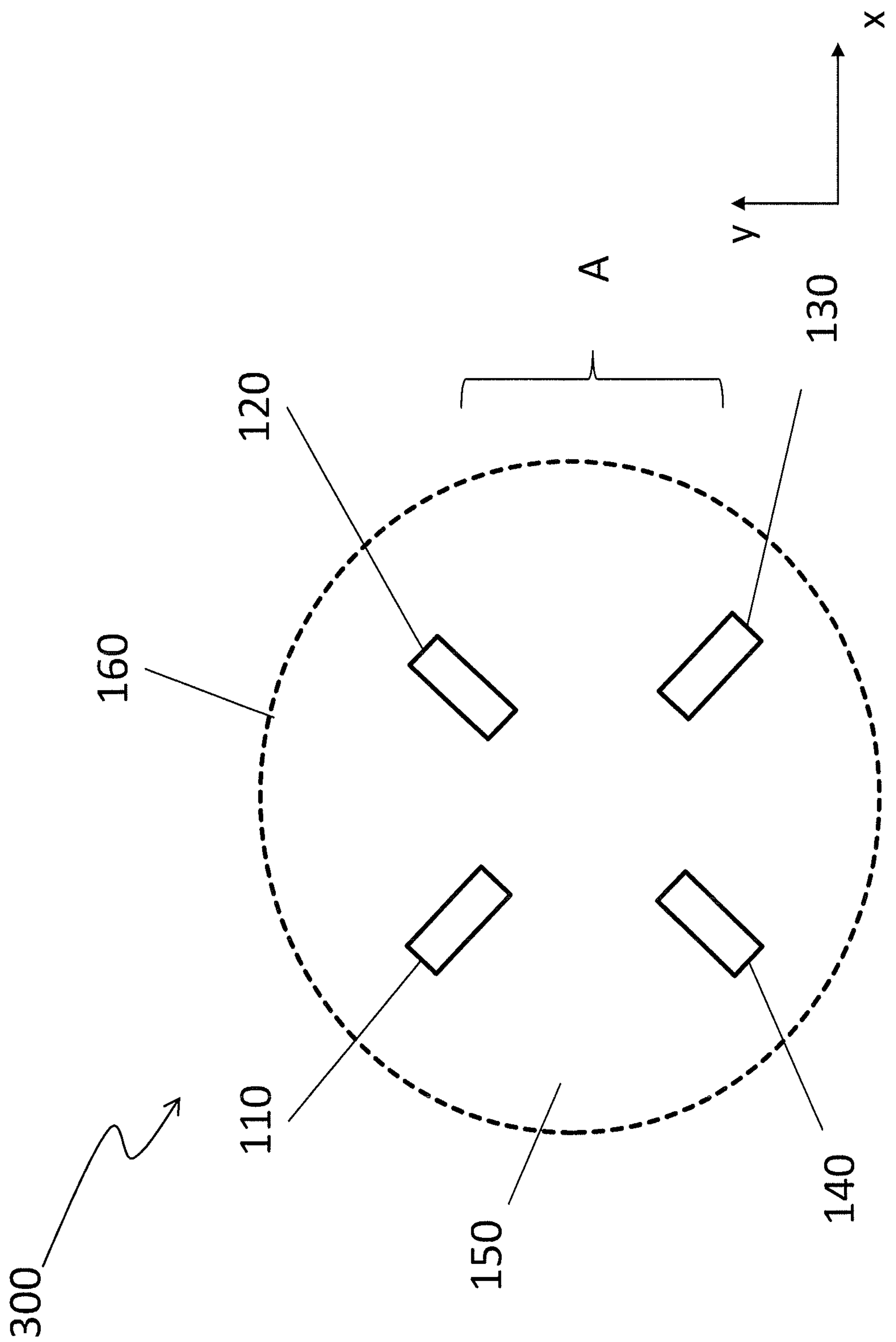
FIG. 3 shows a schematic representation of a cable with four waveguides in a second arrangement.
Figure 6:
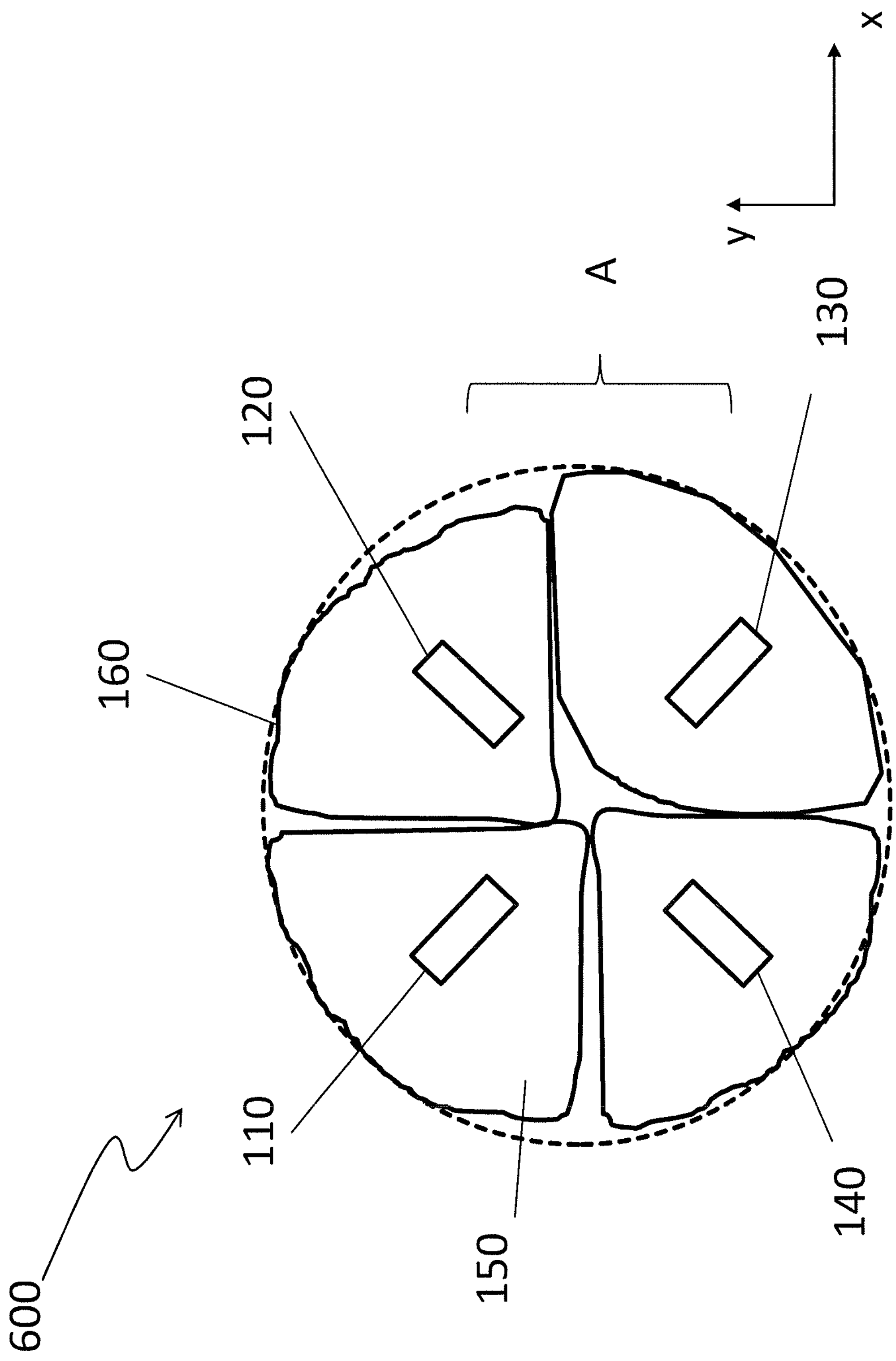
FIG. 6 shows a schematic representation of a cable with four waveguide elements each enclosed by a separate part of the dielectric medium.

In the example from FIG. 1, the cable 100 further has a jacket 160 (see also FIGS. 2, 3, and 6). The jacket 160 can surround the chamber. The cable 100 can thereby be made more weather-resistant. The jacket 160 can likewise end at the end pieces of the cable 100.

The jacket 160 can likewise be conductive. Electromagnetic couplings can thereby be avoided.

The jacket 160 can also end flush with the dielectric medium 150. Water and oxygen inclusions can thereby be avoided, rendering the cable 100 is more durable.

The waveguide elements 110, 120 named herein can each consist of a material with a high $\varepsilon_r$. This can be polyethylene (PE), polypropylene (PP), ethylene-tetrafluoroethylene copolymer (ETFE), fluorinated ethylene propylene (FEP), polytetrafluoroethylene (PTFE), polyester (PES), polyethylene terephthalate (PET) or also quartz glass.

The waveguide elements 110, 120 in FIG. 1 each have a rectangular shape by way of example, but can also have an oval shape. The axis ratio (thus height to width) here is e.g.

at least 1 to 1.4 to 4 (thus maximally 4 times wider than high). This axis ratio can determine the preferred polarization.

The respective waveguide elements 110, 120 can be surrounded by the dielectric medium 150 with a lower $\varepsilon_r$. This dielectric medium 150 has a lower $\varepsilon_r$ than that of the respective waveguide elements 110, 120, in order to form the waveguide. Foamed materials (thus mixtures of a gas and a plastic) are preferably used for this. PE, PP, ETFE, FEP, PTFE or also PES can be used here as a polymer. The plastics can be foamed in a chemical or physical process. The gas bubbles can be smaller than Lambda/4 of a wavelength of a useful frequency of the cable 100 in this case. Another option for the dielectric medium 150 is a banding of expanded PTFE. With this a significantly lower $\varepsilon_r$ than that of the respective waveguide elements 110, 120 can likewise be achieved.

The two waveguide elements 110, 120 (also termed "wave-carrying elements" or also "transmission elements"), which are rectangular in FIG. 1, are oriented differently in FIG. 1. For example, the two wave-carrying elements 110, 120 are twisted relative to one another by an angle of 90°, as shown by way of example in FIG. 1. Consequently, the wide side of one transmission element points to the narrow side of the other transmission element and vice versa. This orientation can avoid mutual interference of the two waveguide elements 110, 120 in the cable. Polarized wave types can be injected into the rectangular (or oval) waveguide elements 110, 120 are only capable of propagation in one position, e.g. in the width of one of the waveguide elements 110, 120. Although the waves projecting into the dielectric medium 150 also intersect the other waveguide element 110, 120 twisted by 90° after a distance, the projected waves cannot propagate in the length therein, as the height of the waveguide element 110, 120, does not match the frequency of the disruptive coupling Further details and aspects are mentioned in connection with the exemplary embodiments described below. The exemplary embodiment shown in FIG. 1 can have one or more optional additional features, which correspond to one or more aspects which are mentioned in connection with the proposed concept or one or more exemplary embodiments described below (e.g. FIGS. 2-4, 5*a*-5*d* and 6).

FIG. 2 shows a schematic representation of a cable 200 with four waveguides, which are formed by a dielectric medium 150 and four waveguide elements 110, 120, 130, 140. In addition to the elements and components of the cable 100 from FIG. 1, the cable 200 further has a third dielectric waveguide element 130. According to the example from FIG. 1, the third dielectric waveguide element 130 is spaced at a distance from the first and second dielectric waveguide elements 110, 120. The preferred polarization direction of the first dielectric waveguide element 110 corresponds in the example from FIG. 2 to a preferred polarization direction of the third dielectric waveguide element 130. In the case of only three waveguide elements 110, 120, 130, the preferred polarization directions of the first, second and third dielectric waveguide elements 110, 120, 130 can each differ from one another by an angle of 60°.

The cable 200 further has a fourth dielectric waveguide element 140. The fourth dielectric waveguide element 140 is spaced at a distance from the first, second and third dielectric waveguide elements 110, 120, 130 according to the example from FIG. 2. The preferred polarization direction of the second dielectric waveguide element 120 corresponds in the example from FIG. 2 to a preferred polarization direction of the fourth dielectric waveguide element 140.

Using several waveguides formed by the waveguide elements 110, 120, 130 and 140 and the dielectric medium 150 can provide a greater transmission rate and more throughput. At frequencies of over 100 GHz (except for light), a higher bandwidth can likewise be provided.

A distance between the first and second waveguide elements 110, 120, and the second and third waveguide elements 120, 130, and the third and fourth waveguide elements 130, 140 and also the fourth and first waveguide elements 140, 110, is identical in the example from FIG. 2. This distance is termed "value A" (see FIGS. 3 and 6).

A distance between the first and third waveguide element 110, 130 corresponds in the example from FIG. 2 to a distance between the second and fourth waveguide element 120, 140. This distance can be termed "value B".

The value B can be $\sqrt{2}$*A. Even if the first and third waveguide elements 110, 130 and the second and fourth waveguide elements 120, 140 have the same preferred polarization direction, a coupling to the respectively other waveguide element can be reduced due to the value B being $\sqrt{2}$ times greater than the value A.

The respective distance between the waveguide elements can be determined starting out from a centre of a respective cross section of the waveguide elements in the same cross-sectional plane of the cable 200.

In the case of a cable 200 with four waveguides 110, 120, 130, 140 inside the cable 200 (formed by four waveguide elements and a dielectric medium 150 around the same), the conditions are comparable with the case of a cable 200 with two waveguides (formed by two waveguide elements and a dielectric medium 150 around the same, see FIG. 1). The directly adjacent waveguide elements can be rotated by 90° as shown in FIG. 2, diagonally opposed waveguide elements having an identical orientation. Since diagonally opposed waveguide elements have a spacing that is greater by $\sqrt{2}$ the crosstalk between waveguide elements is attenuated.

Further details and aspects are mentioned in connection with the exemplary embodiments described above or below. The exemplary embodiment shown in FIG. 2 can have one or more optional additional features, which correspond to one or more aspects, which are mentioned in connection with the proposed concept or one or more exemplary embodiments described above (e.g. FIG. 1) or below (e.g. FIGS. 3, 4, 5*a*-5*d* and 6).

FIG. 3 shows a schematic representation of a cable 300 with four waveguides in a second arrangement similar to FIG. 2, but with another orientation of the four waveguide elements 110, 120, 130, 140. The dielectric medium 150 can have a sufficiently large diameter here to guarantee that the field components of the propagating mode in the lossy jacket material are negligible (if a jacket is used). The jacket structure to be recognized in the illustration is used here to protect against environmental influences (dirt, water and other environmental influences).

Further details and aspects are mentioned in connection with the exemplary embodiments described above or below. The exemplary embodiment shown in FIG. 3 can have one or more optional additional features, which correspond to one or more aspects, which are mentioned in connection with the proposed concept or one or more exemplary embodiments described above (e.g. FIGS. 1-2) or below (e.g. FIGS. 4, 5*a*-5*d*, and 6).

Figure 4:
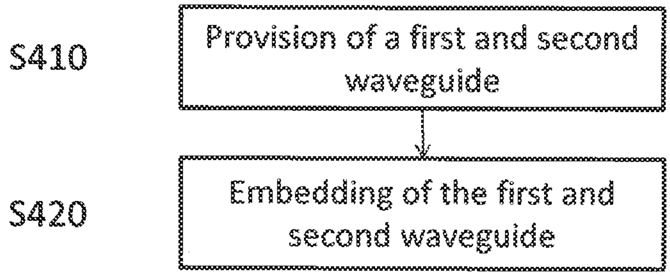
FIG. 4 shows a schematic representation of a method for manufacturing a cable.

FIG. 4 shows a schematic representation of a method for manufacturing a cable. The method comprises provision S410 of a first and second dielectric waveguide element. The first and second dielectric waveguide elements are spaced at a distance from one another. The first dielectric waveguide element is twisted by comparison with the second dielectric waveguide element, so that a preferred polarization direction of the first dielectric waveguide element differs from a preferred polarization direction of the second dielectric waveguide element in the cable. The method can further comprise embedding S420 of the first and second dielectric waveguide element in a chamber made of a dielectric medium.

In addition, the method can comprise the separate embedding of the first and second (as well as third and fourth) dielectric waveguide elements in segments of the dielectric medium. Furthermore, the method can comprise stranding of the first and second (as well as third and fourth) dielectric waveguide elements embedded in this way to form a waveguide with two (four) waveguides. Sheathing can take place as a separate step to join the stranded elements together to form the cable.

Further details and aspects are mentioned in connection with the exemplary embodiments described above or below. The exemplary embodiment shown in FIG. 4 can have one or more optional additional features, which correspond to one or more aspects, which are mentioned in connection with the proposed concept or one or more exemplary embodiments described above (e.g. FIGS. 1-3) or below (e.g. FIGS. 5*a*-5*d* and 6).

Figure 5A:
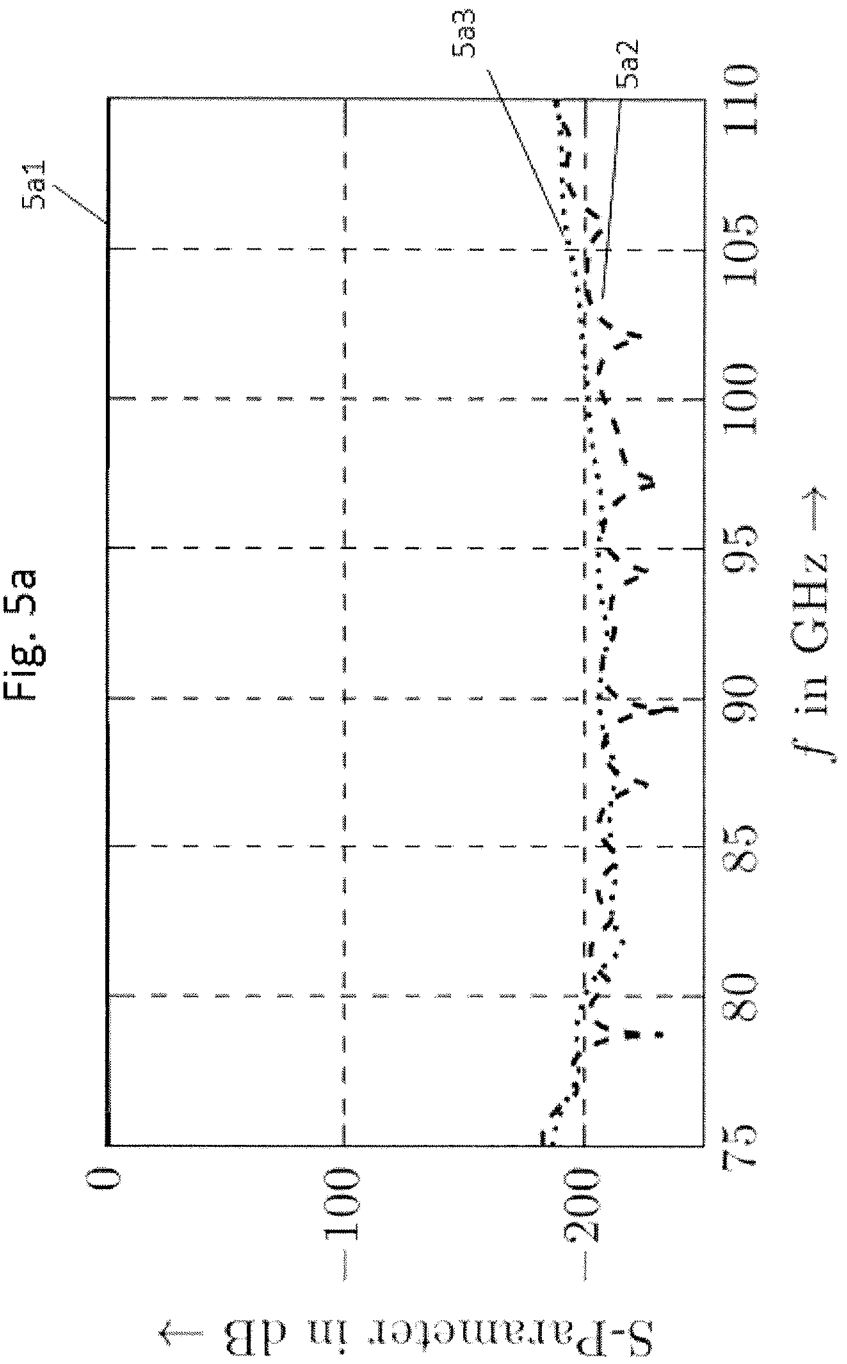
FIG. 5*a* shows a Scattering Parameter (S-parameter) in dB versus frequency (f) in GHz result for a cable with two waveguides according to FIG. 1.

FIG. 5*a* shows an S-parameter result for a cable with two waveguides. Curve 5*a*1 describes the insertion loss (IL). Curve 5*a*2 describes the near end crosstalk (NEXT). Curve 5*a*3 describes the far end crosstalk (FEXT).

Figure 5B:
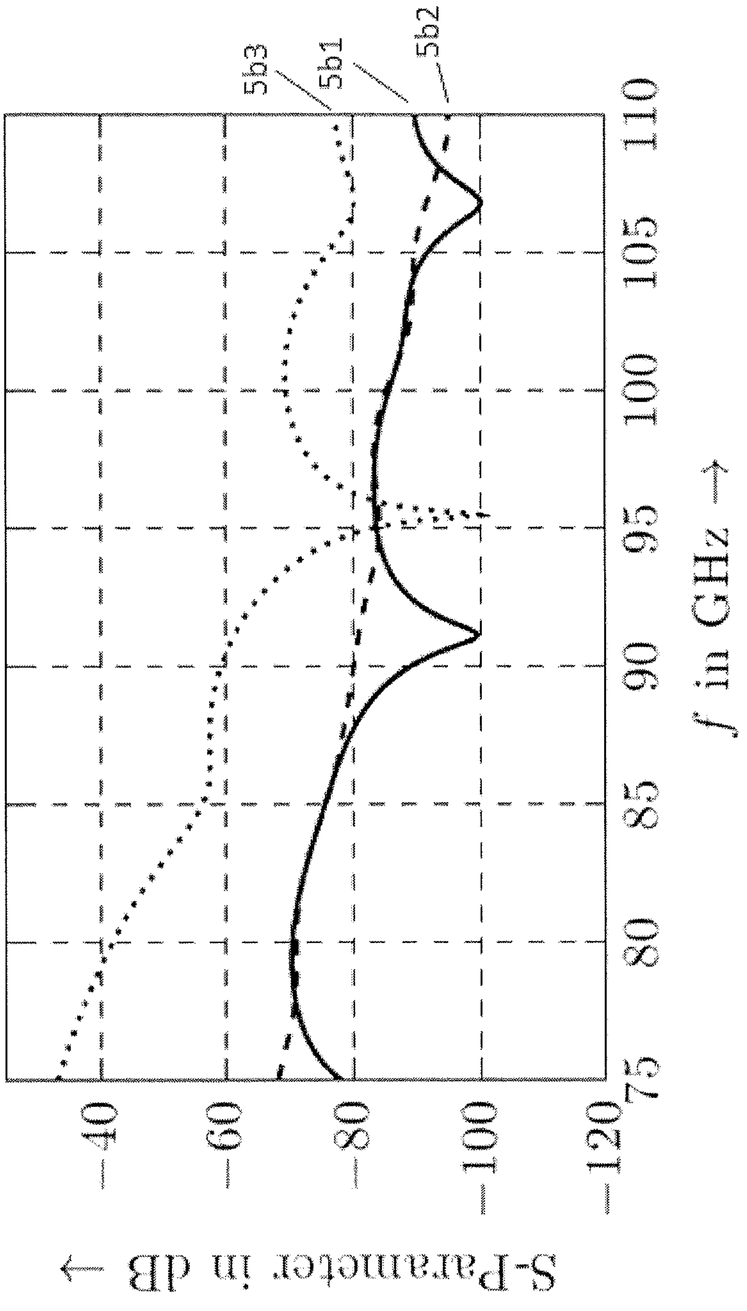
FIG. 5*b* shows an S-parameter in dB versus frequency (f) in GHz result for a cable with four waveguides according to FIG. 2.

FIG. 5*b* shows an S-parameter result for a cable with four waveguides according to the first arrangement. Here the three FEXT curves 5*b*1, 5*b*2 and 5*b*3 are shown in FIG. 5*b*, which result by measurement during supplying of one of the waveguide elements.

Figure 5C:
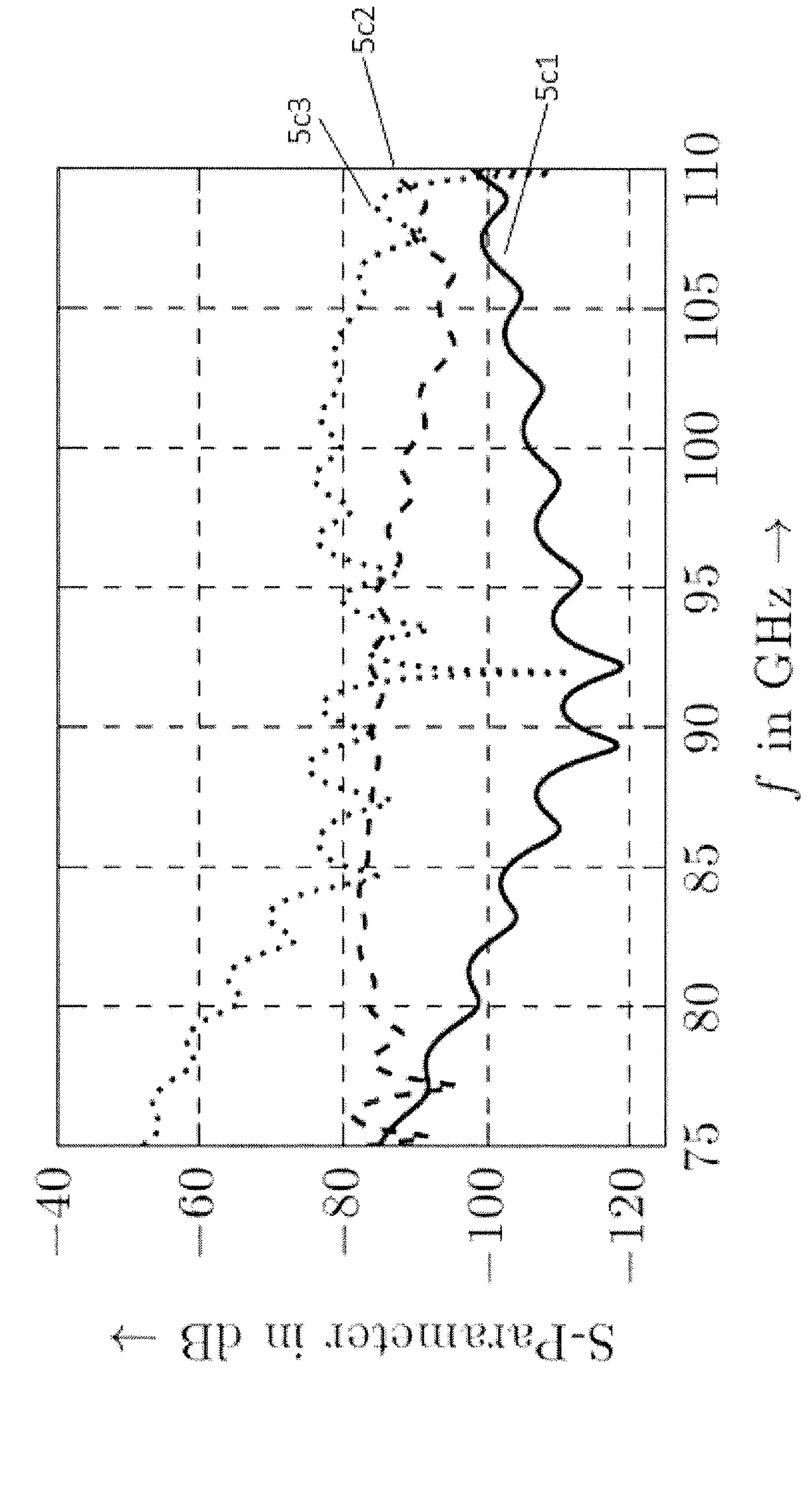
FIG. 5*c* shows an S-parameter in dB versus frequency (f) in GHz result for a cable with four waveguides according to FIG. 2.

FIG. 5*c* shows an S-parameter result for a cable with four waveguides according to the first arrangement. Here the three NEXT curves 5*c*1, 5*c*2 and 5*c*3 are shown in FIG. 5*c*, which result by measurement during supplying of one of the waveguide elements.

Figure 5D:
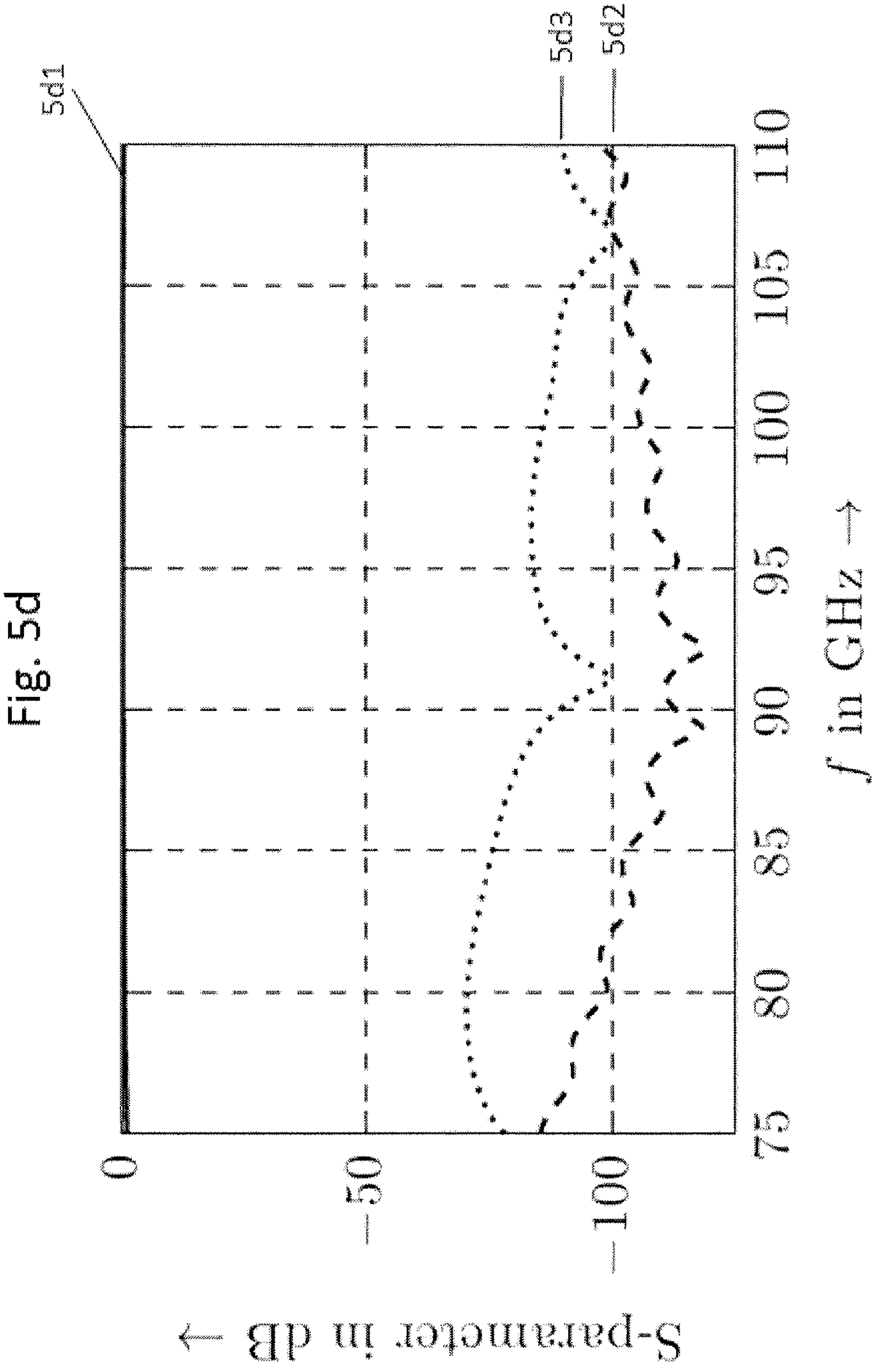
FIG. 5*d* shows an S-parameter in dB versus frequency (f) in GHz result for a cable with four waveguides according to FIG. 2.

FIG. 5*d* shows an S-parameter result for a cable with four waveguides according to FIG. 2. The insertion loss is provided in FIG. 5*d* by 5*d*1. The FEXT curve 5*b*1 in FIG. 5*b* further corresponds to the FEXT curve 5*d*3 in FIG. 5*d*. The NEXT curve 5*c*1 in FIG. 5*c* also corresponds to the NEXT curve 5*d*2 in FIG. 5*d*.

FIG. 6 shows a schematic representation of a cable 600 with four waveguides 110, 120, 130, 140 each surrounded by a separate part of a dielectric medium 150. The chamber in the example from FIG. 6 comprises several segments of the dielectric medium 150, as described above. In this case the dielectric medium 150 is divided into several segments. Each segment of the dielectric medium 150 encloses/surrounds one of the (first/second/third/fourth) waveguide elements 110, 120, 130, 140 separately (in the chamber) in the example from FIG. 6. The segments can be in mutual contact. The segments can each likewise contact the jacket 160.

If great mechanical loads act on the cable 600, it can be advantageous to strand the waveguides (formed by a respective segment of the dielectric medium and a corresponding waveguide element 110, 120, 130, 140). Here each waveguide element 110, 120, 130, 140 can be fabricated together with the dielectric medium 150 as a separate (individual) waveguide of the cable 600. Several individual waveguides of the cable 600 can then be stranded with one another. Stranding with reverse twist can be used in this case. It is thereby guaranteed that the orientations of the waveguides and also of the corresponding waveguide elements 110, 120, 130, 140 are not displaced to one another.

Moreover, a torsion of the transmission elements 110, 120, 130, 140 negatively affecting the transmission properties can be avoided. It is not absolutely necessary here, however, that the dielectric medium 150 has a round outer contour. A roughly rectangular contour, for example, is advantageous because round surfaces easily twist in relation to one another, while rectangular faces brace one another. A continuation consists in a segmented outer form of the individual components.

Further details and aspects are mentioned in connection with the exemplary embodiments described above. The exemplary embodiment shown in FIG. 6 can have one or more optional additional features, which correspond to one or more aspects, which are mentioned in connection with the proposed concept or one or more exemplary embodiments described above (e.g. FIGS. 1-4 and 5*a*-5*d*).

According to one or more of the aforesaid aspects, a cable optimized for crosstalk can be provided with two or four waveguides in a common jacket. The waveguide elements contained in the cable can each have a rectangular or oval cross section (height to width ratio between 1:1.4 to 4). The dielectric medium 150 used in the cable can be one part (common element for all waveguide elements) or a plurality of parts. Each part can then surround a respective waveguide element separately. The parts surrounding the corresponding waveguide elements can then be stranded with one another, e.g. with reverse twist during production, to retain the orientation. These individual parts can have a rectangular or segmented cross section.

The cable described above can have the following advantages. A dielectric waveguide can be very light and flexible. It does not break, for example, even in the event of maximum reverse bending demands. In addition, a transmission frequency can be extremely high, e.g. in the range of 100 GHz to 150 GHz, or also over 50 GHz, over 70 GHz, over 90 GHz, over 100 GHz, over 120 GHz, over 130 GHz or over 140 GHz. An extremely large data bandwidth can be provided thereby. Moreover, it can be made possible with the structure described to double or quadruple the transmissible bandwidth with respect to a structure with only one transmission element without channels significantly influencing one another.

Furthermore, cables of this kind have the advantage of being able to carry no current. Since no conductor is present, therefore, there cannot be any sparks either. Consequently, a damage risk can be reduced and electromagnetic compatibility improved.

The aspects and features that were mentioned and described together with one or more of the examples and figures described in detail above can further be combined with one or more of the other examples to replace a similar feature of the other example or to introduce the feature additionally into the other example.

The present disclosure is not limited in any way to the embodiments described previously. On the contrary, many opportunities for modifications thereto are evident to an average expert without departing from the fundamental idea of the present disclosure as defined in the enclosed claims.

The invention claimed is:

1. Cable having:

a dielectric medium forming a chamber; and first, second, and third dielectric waveguide elements, which are each spaced at a distance from one another and each extend along a longitudinal direction of the cable through the chamber, the preferred polarisation directions of the first, second and third dielectric waveguide element each differing from one another by an angle of 60°.

2. Cable according to claim 1, wherein the dielectric medium has a round cross-section.

3. Cable according to claim 1, the preferred polarisation direction of the first dielectric waveguide element being determined by a respective cross section of the first dielectric waveguide element and the preferred polarisation direction of the second dielectric waveguide element being determined by a respective cross section of the second dielectric waveguide element.

4. Cable according to claim 1, wherein respective dielectric constants of the first and second dielectric waveguide elements are at least substantially identical.

5. Cable according to claim 1, the dielectric constant of the dielectric medium being lower than at least one of the dielectric constants of the first and second dielectric waveguide elements.

6. Cable according to claim 1, further having a jacket, which surrounds the chamber.

7. Cable according to claim 6, the jacket being at least partly conductive and/or non-conductive.

8. Cable according to claim 6, the jacket ending flush with the dielectric medium.

9. Cable according to claim 1, wherein the dielectric medium is formed in separate segments that each surrounds a respective one of the first, second, and third dielectric waveguide elements.

10. Method for manufacturing a cable, the method comprising the steps:

provision of first, second, third and fourth dielectric waveguide elements, which are each spaced at a distance from one another and the waveguide elements being twisted respectively by comparison with one another, a preferred polarisation direction of the first dielectric waveguide element differing from a preferred polarisation direction of the second dielectric waveguide element in the cable, and the preferred polarisation direction of the first dielectric waveguide element corresponding to a preferred polarisation direction of the third dielectric waveguide element, and the preferred polarisation direction of the second dielectric waveguide element corresponding to a preferred polarisation direction of the fourth dielectric waveguide element, wherein an arrangement of the four dielectric waveguides asymmetrically encircles a line crossing a centre point of the cable; and embedding of the first, second, third, and fourth dielectric waveguide elements into a chamber made of a dielectric medium, or embedding of the first, second, third, and fourth dielectric waveguide elements into respective segments of the dielectric medium, which forms the chamber by stranding of the segments.

11. Method according to claim 10, wherein the first, second, third, and fourth dielectric waveguide elements are embedded into respective segments of the dielectric medium, said segments then being twisted relative to one another along the length of the cable.

12. Method according to claim 10, wherein the segments of the dielectric medium are rectangular in cross section.

13. Method according to claim 10, wherein the segments of the dielectric medium are segmented in cross section.

14. Cable having:

a dielectric medium forming a chamber; and first, second, third, and fourth dielectric waveguide elements, which are each spaced at a distance from one another and each extend along a longitudinal direction of the cable through the chamber, the preferred polarisation direction of the first dielectric waveguide element differing from the preferred polarisation direction of the second dielectric waveguide element, and the preferred polarisation direction of the first dielectric waveguide element corresponding to a preferred polarisation direction of the third dielectric waveguide element; and the preferred polarisation direction of the second dielectric waveguide element corresponding to a preferred polarisation direction of the fourth dielectric waveguide element, wherein an arrangement of the four dielectric waveguides asymmetrically encircles a line crossing a centre point of the cable.

15. Cable according to claim 14, wherein the dielectric medium is formed in separate segments that each surrounds a respective one of the first, second, third, and fourth dielectric waveguide elements.

16. Cable according to claim 14, wherein the dielectric medium has a round cross-section.

17. Method for manufacturing a cable, the method comprising the steps:

provision of first, second and third dielectric waveguide elements, which are each spaced at a distance from one another and the waveguide elements being twisted respectively by comparison with one another, so that a preferred polarisation direction of the respective waveguide elements differs by 60° in each case; and embedding of the first, second and third dielectric waveguide elements into a chamber made of a dielectric medium, or elements embedding of the first, second and third dielectric waveguide elements into respective segments of the dielectric medium, which forms the chamber by stranding of the segments.

18. Method according to claim 17, wherein the first, second, and third dielectric waveguide elements are embedded into respective segments of the dielectric medium, said segments then being twisted relative to one another along the length of the cable.

19. Method according to claim 17, wherein the segments of the dielectric medium are rectangular in cross section.

20. Method according to claim 17, wherein the segments of the dielectric medium are segmented in cross section.

* * * * *